United States Patent [19]

Taneda et al.

[11] Patent Number: 4,653,963

[45] Date of Patent: Mar. 31, 1987

[54] TRANSPORT APPARATUS FOR FLAT ARTICLES

[75] Inventors: Kozo Taneda, Kodaira; Masae Chiba, Kawasaki; Junichi Naka, Tokyo; Shunichi Watanabe, Machida, all of Japan

[73] Assignee: Snow Brand Milk Products Co., Ltd., Sapporo, Japan

[21] Appl. No.: 823,221

[22] Filed: Jan. 28, 1986

Related U.S. Application Data

[62] Division of Ser. No. 619,871, Jun. 12, 1984, Pat. No. 4,583,884.

[30] Foreign Application Priority Data

Jun. 22, 1983 [JP] Japan .................. 58-113175
Mar. 23, 1984 [JP] Japan .................. 59-55837

[51] Int. Cl.⁴ ............................................. B65G 51/04
[52] U.S. Cl. ....................................... 406/70; 406/73; 414/403

[58] Field of Search ............... 406/70, 73, 110–112; 414/403, 411, 412; 104/138 R, 167

[56] References Cited

U.S. PATENT DOCUMENTS

| 59,739 | 11/1866 | Beach | 406/185 X |
| 2,310,417 | 2/1943 | Gent | 406/70 |
| 4,580,938 | 4/1986 | Mojden et al. | 414/412 X |

Primary Examiner—Jeffrey V. Nase
Attorney, Agent, or Firm—Flynn, Thiel, Boutell & Tanis

[57] ABSTRACT

In a transport apparatus, a plurality of flat bodies are respectively aligned uprightly and juxtaposed laterally to form a block of the flat bodies, the block is loaded in a movable capsule, and the capsule is transported under the application of air flow through a transport pipeline. A loading mechanism having a pair of openable and closable holding arms is disposed to oppose a loading opening of a loading station, and an unloading mechanism having a pair of openable and closable holding arms is disposed to oppose an unloading opening of an unloading station.

5 Claims, 26 Drawing Figures

FIG. 2
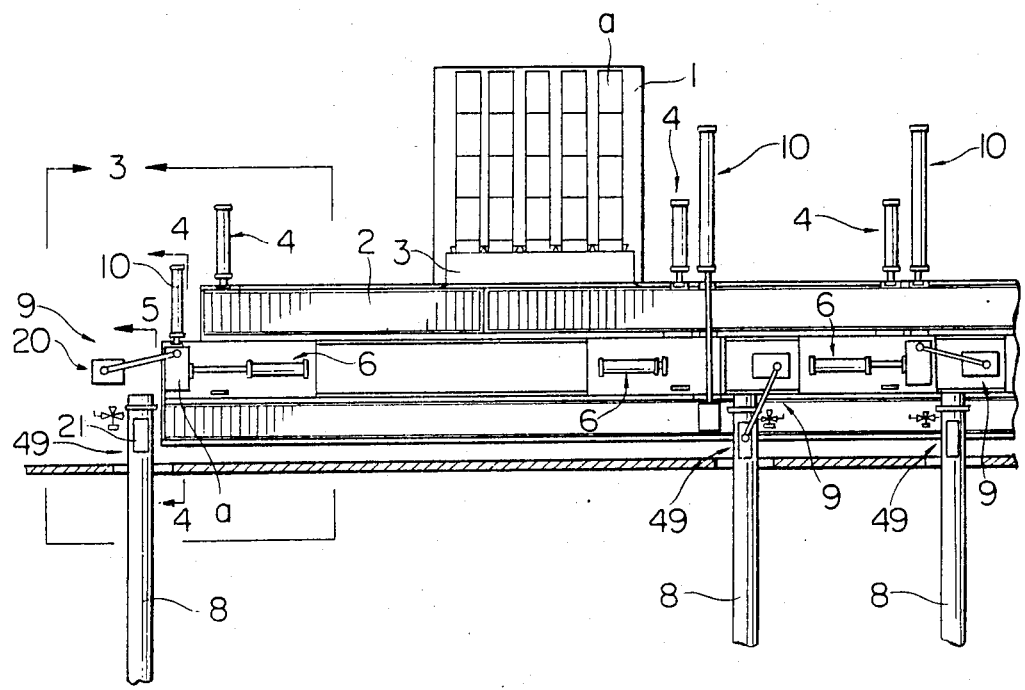
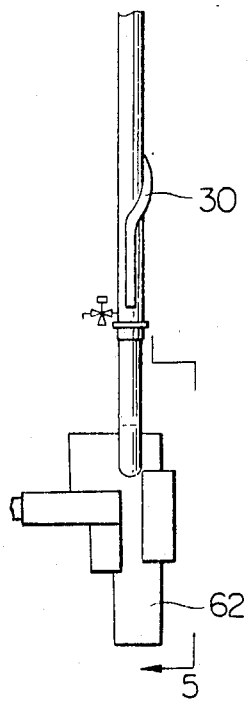

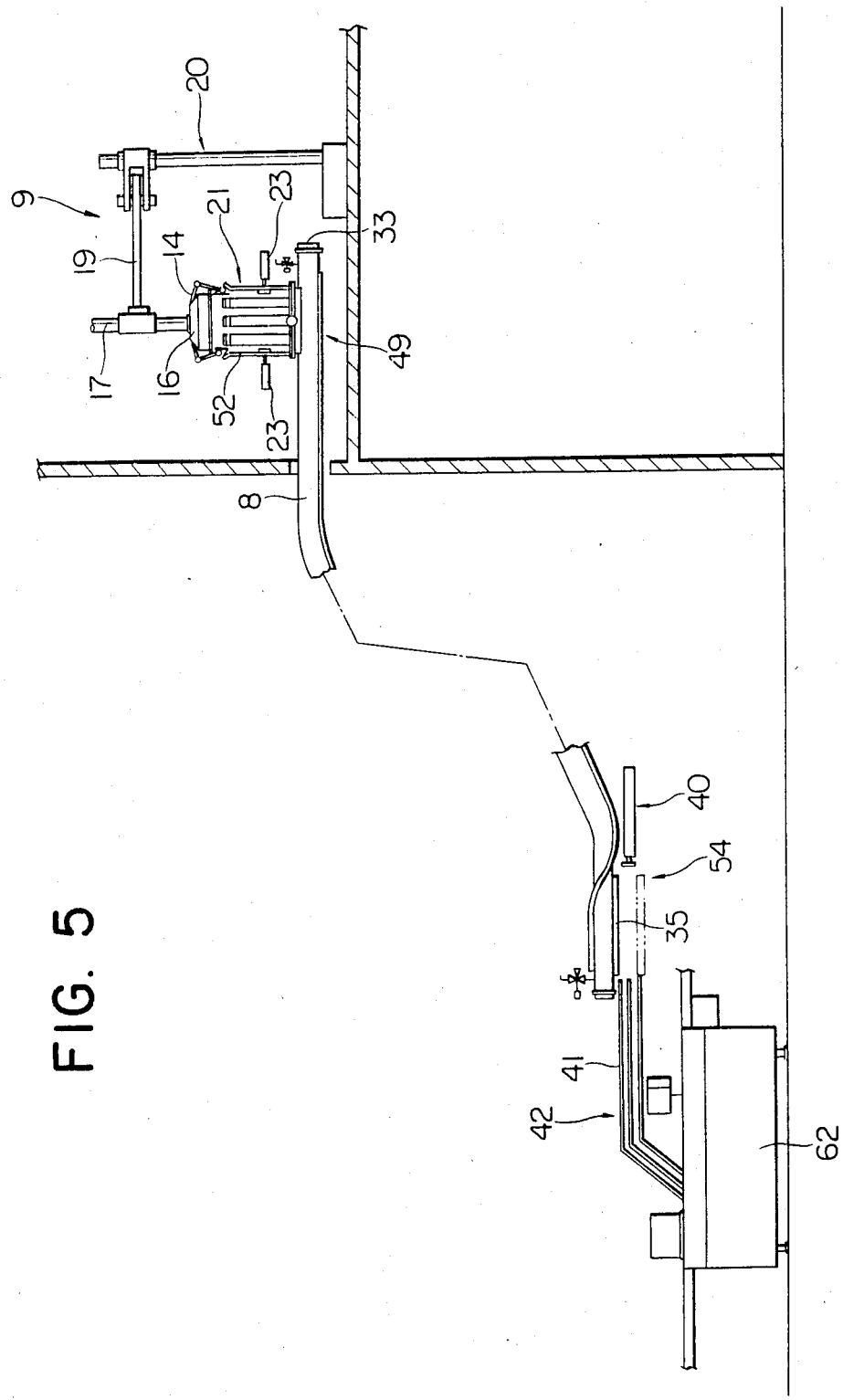

FIG. 15
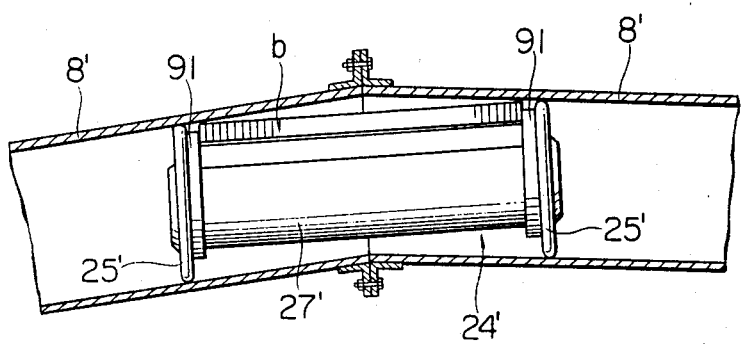
FIG. 16
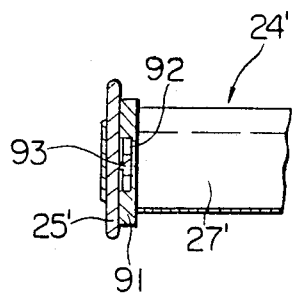
FIG. 18
FIG. 17
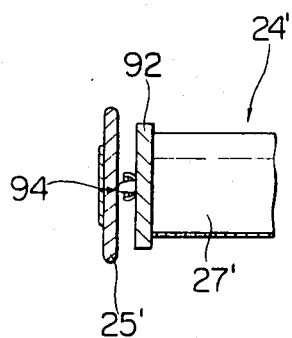
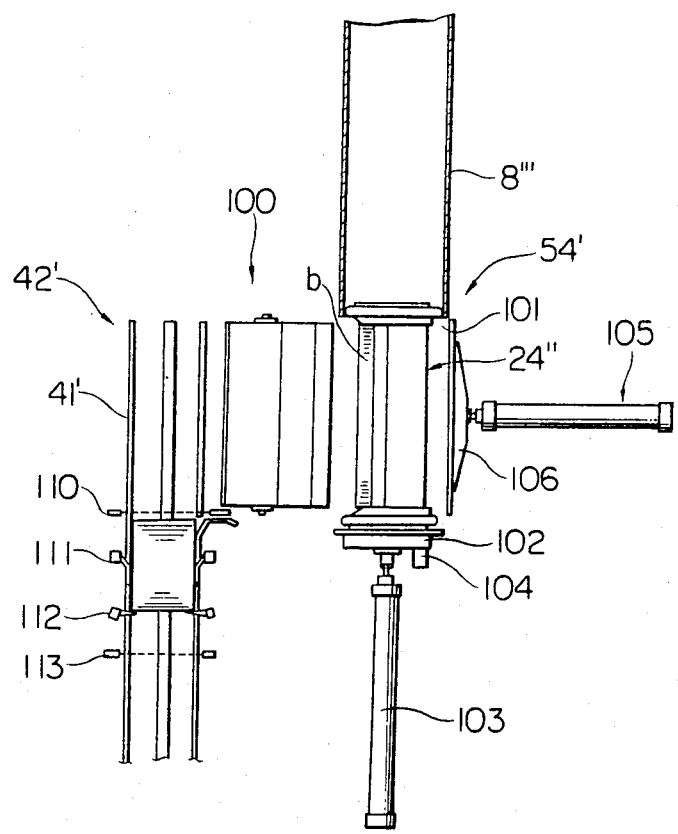

TRANSPORT APPARATUS FOR FLAT ARTICLES

This is a division, of application Ser. No. 619,871, filed June 12, 1984, now U.S. Pat. No. 4,583,884 issued Apr. 22, 1986.

BACKGROUND OF THE INVENTION

This invention relates to a transport apparatus of the type in which a capsule in which is accommodated a number of flat articles is transported by air flow through a transport pipeline.

Conventionally, this type of transport apparatus has already been known wherein a capsule in which is accommodated articles is transported by air flow through a pipeline. Advantageous convenience of the transport apparatus has been highly evaluated, because articles can be transported from a stockroom to a utilization place in a workshop, without disturbing the other workings and requiring any surplus space.

The conventional transport apparatus utilizing the air flow, however, fails to transport flat articles such as a carton for storage of various materials which collapses into a flat form prior to storage of the material, and a cover or lid of a vessel. In general, these flat bodies are accommodated in a container such as shown in FIG. 1 for their storage in the stockroom. Typically, when accommodating these flat bodies in the container, a number of flat bodies (200 to 300 sheets in the case of carton) are respectively aligned uprightly and juxtaposed laterally to form an elongated block of the flat bodies. A plurality of such blocks, each extending laterally, are loaded into the container in row and column pattern. However, no prior arrangement can pull out the loaded flat bodies from the container, without disturbing their block form, to charge the pulled-out block into the capsule and pull out the charged block of, for example, carbons from the capsule to set that block into a loader. Without this arrangement, the conventional transport apparatus utilizing air flow cannot transport the flat bodies, simply leading to the fact that when the carton block is pulled out of the container or the capsule by means of a known pull-out arrangement, the block collapses and cartons are spread.

For these reasons, it has been practice to transport the container per se accommodating the flat bodies from the stockroom to the utilization place, resulting in disadvantages that the other workings are disturbed and a surplus space is required for storage and transport of the container.

SUMMARY OF THE INVENTION

A principal object of the present invention is to provide a transport apparatus which can eliminate the above disadvantages of the conventional transport apparatus and which can load one of blocks of a plurality of flat bodies, aligned uprightly and juxtaposed laterally in a container, into a capsule from the container and unload the block from the capsule.

According to this invention, the above object can be accomplished by providing a transport apparatus comprising a loading means, provided at a loading station of a transport pipeline, having a pair of openable and closable holding arms, and an unloading means, provided at an unloading station of the pipeline, having a pair of openable and closable holding arms. When loading and unloading a block of flat bodies, the holding arms are engaged with the opposite end surfaces of the block and urged thereagainst to press and hold the block, thereby preventing the block from collapsing.

According to a preferred embodiment of the present invention, the above object can be accomplished more steadily by a transport apparatus wherein the holding arms of the loading means are swingably mounted to opposite sides of a suction head which covers substantially the entire top surface of the block, and a drive means for swinging the holding arms of the loading means is provided on the suction head. The holding arms of the loading means press and hold the opposite ends of the block and in addition, the suction head adsorbs the entire top surface of the block, thereby preventing more steadily the block from collapsing.

Another object of the present invention is to provide a transport apparatus which can ensure easy loading and unloading of articles to be transported at the loading and unloading stations of the pipeline, and which can ensure effective prevention of accidental run-out of the articles from the capsule during the transport.

This object can be accomplished by an embodiment wherein the capsule is constituted by a body portion and opposed end plates longitudinally movably coupled to the body portion, bias members are provided for the coupling portions for biasing the end plates such that these end plates are urged to space apart from the body portion, and the pipeline is twisted at its intermediate portion so that a loading opening faces upwards at the loading station and an unloading opening faces downwards at the unloading station, whereby the capsule undergoes a corresponding inversion in the course of its movement. At the loading and unloading stations, the opposed end plates of the capsule are not applied with pressure of the transport air and as a result, the opposed end plates are spaced apart from each other by the bias members to extend the opening for loading and unloading into which the articles to be transported are charged by weight or are dropped from the capsule, thereby facilitating loading and unloading. During the transport, the pressure of transport air overcomes bias force of the bias members to cause the opposed end plates to approach to each other, thereby pressing and holding the articles to be transported and suppressing run-out of the object from the capsule.

Still another object of this invention is to provide a transport apparatus which can ensure smooth movement of the capsule by adaptively deforming or displacing the capsule when the pipeline is curved, inverted or twisted.

This object can be accomplished by an embodiment wherein the pipeline is constructed either to have a substantially circular crosssectional configuration with a longitudinally extending groove formed in part of the pipeline or to have an elliptical crosssectional configuration, the end plates of the capsule are made analogous to the crosssectional configuration of the pipeline and dimensioned to be slightly smaller than the crosssectional configuration, the capsule is formed with a projection which is fitted in the groove of the pipeline when having the circular crosssectional configuration, the body portion of the capsule is made of either a flexible material or a rigid material, and the body portion is coupled with the opposed end plates through displaceable joints when the body portion is made of the rigid material. The analogous relationship between the crosssectional configuration of the pipeline and the configuration of the end plates ensures that during the movement of the capsule, the end plates or the capsule can automatically be turned or inverted as the pipeline becomes twisted, and that during the movement of the capsule, the curvature of the body portion or the joint action can cause the capsule to adaptively curved or displaced as the pipeline becomes curved.

Still another object of the present invention is to provide a transport apparatus which can automatically pull out a bag from a package wrapping the block of flat bodies which block is packed by the bag, when the package is unloaded at the unloading station.

This object can be accomplished by providing a transport apparatus comprising a guide means for uprightly receiving the block unloaded according to this invention, and a pair of rollers rotatably mounted on a horizontal rotary shaft beneath a lower end opening of the guide means and having outer peripheral surfaces being in contact with each other. The bag of the packed block descending through the guide means is clamped, at its lower end, by the rotary rollers and pulled out of the block, without necessitating manual operation at all.

BRIEF DESCRIPTION OF THE DRAWINGS

In the accompanying drawings

FIG. 2 is a fragmentary plan view showing a transport system incorporating the transport apparatus according to the invention;

FIG. 5 is a view of a first embodiment of the transport apparatus, sectioned on line 5—5 and as viewed in the direction of arrow in FIG. 2;

FIG. 15 is a longitudinally sectioned front view showing the state of a capsule at a bent or curved portion of the pipeline in the embodiment showing in FIG. 14;

FIG. 16 is a longitudinally sectioned front view showing an end plate portion of the capsule shown in FIG. 15;

FIG. 17 is a longitudinally sectioned front view showing a modification of FIG. 16;

FIG. 18 is a longitudinally sectioned front view showing an unloading station of the pipeline according to a fourth embodiment of the transport apparatus of the invention;

DETAILED DESCRIPTION OF THE INVENTION

Figure 1:
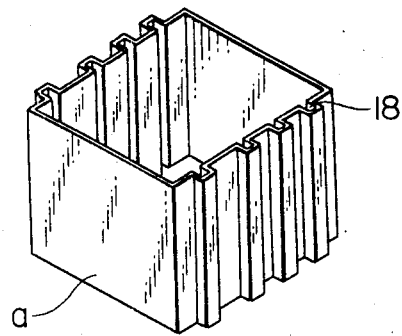
FIG. 1 is a perspective view of a container for accommodating a plurality sets of blocks each consisting of a plurality of flat articles to be transported by a transport apparatus according to the invention and for transporting these flat articles to a stock conveyor.

In the drawings, reference numeral a designates a container and b a carton block consisting of a plurality of cartons to be stacked in the container a. As shown in FIG. 1, the container a has front and rear walls respectively formed with a plurality of grooves 18. The container also has a bottom plate 44 having a plurality of slits 45 therethrough, and a receiving plate 43 is fitted in the container as shown in FIG. 4.

FIGS. 2 to 10 show transport equipments incorporating a transport apparatus according to a first embodiment of this invention. Referring to FIG. 2, there is illustrated a stock conveyor 1 which carries a plurality of containers a arranged in row and column. Adjacent the foremost row of the containers on the conveyor 1 is disposed a dividing apparatus 3 which is typically used in the art.

In front of the dividing apparatus 3 is installed a first roller conveyor 2 which is driven intermittently. A first pusher 4 is disposed to extend above the roller conveyor 2 at right angle thereto. Adjacent to and in parallel with the roller conveyor 2 is provided a carton delivery portion 7 in the form of a flat plate which is substantially flush with the roller conveyor 2. Disposed on the carton delivery portion 7 is a second pusher 6 which extends at right angle to the first pusher 4. A third pusher 10 is provided at a location where the pushing stroke of the second pusher 6 terminates, extending at right angle to the second pusher 6. Adjacent to and in parallel with the delivery portion 7 is provided a second roller conveyor 11 which is substantially flush with the delivery portion 7. A stopper plate 46 is connected to one end of the delivery portion 7.

Figure 4:
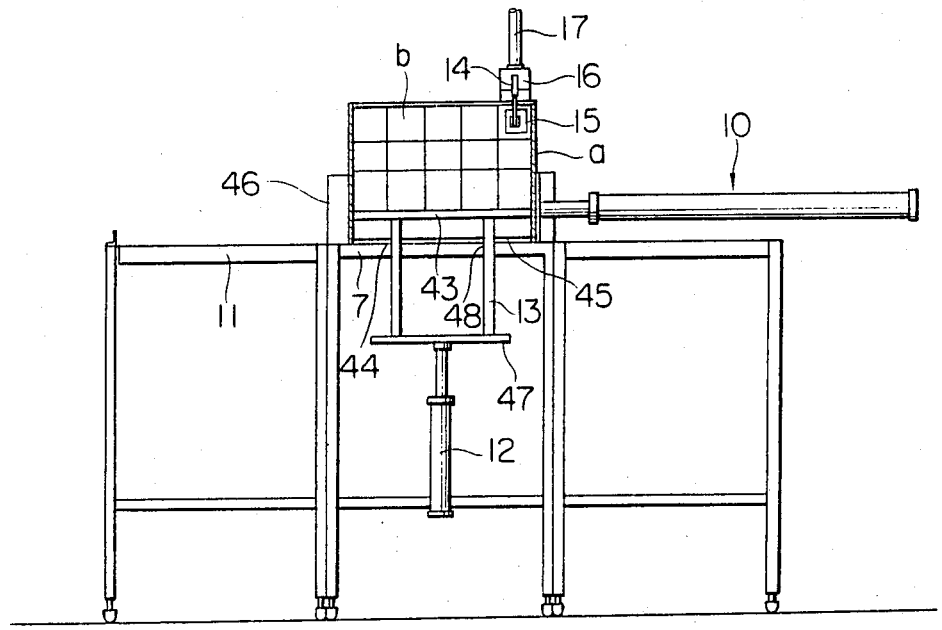
FIG. 4 is a view sectioned on line 4—4 and as viewed in the direction of arrow in FIG. 2.

As shown in FIG. 4, a lifting cylinder 12, which is upstanding upwards, is provided beneath the delivery portion 7 serving as a stroke path for the third pusher 10. Connected to the top end of a piston rod of the lifting cylinder 12 is a connecting plate 47 on which a plurality of upright push bars 13 are mounted. An upper end of each of the push bars 13 is inserted in a hole 48 formed in the delivery portion 7, for vertical movement therethrough.

A transport pipeline 8 is installed above the second roller conveyor 11 at right angle thereto. Adjacent to a loading station 49 of this pipeline 8 is disposed a carton transfer apparatus 9. The transfer apparatus 9 includes a robot 20 with a turn arm 19 which moves a suction head 16, carried thereon, between the delivery portion 7 and the loading station 49 of pipeline 8. The suction head 16 has substantially the same length as that of the carton block b and has longitudinally opposite end walls to which holding arms 14 are swingably mounted. Each holding arm 14 has, at its tip, a holding piece 15 which is swung by a drive means 15A mounted on the suction head 16 to open or close the holding piece 15. The head 16 has a flat bottom surface formed with a plurality of suction holes not shown and a top surface connected with a suction pipe 17.

Figure 6:
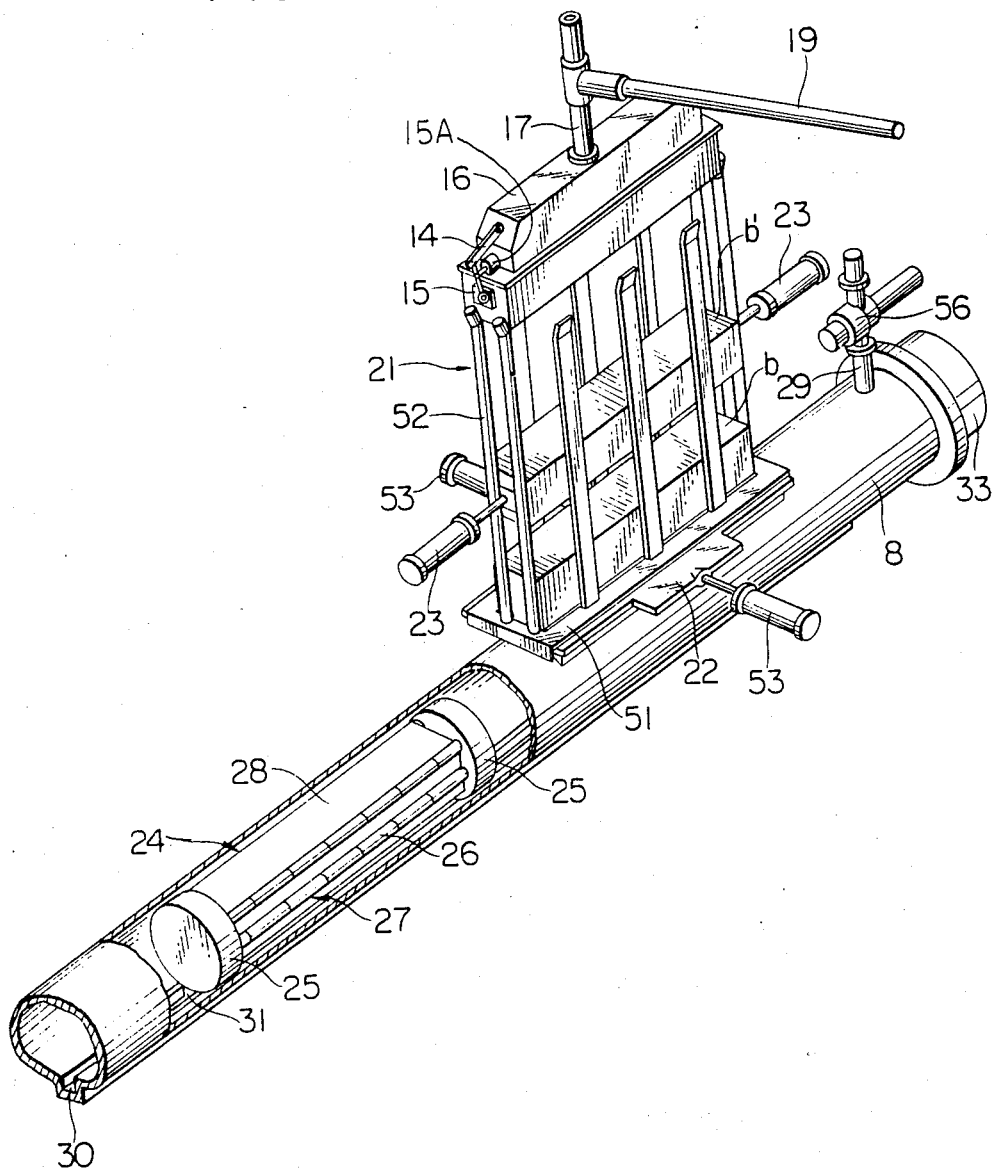
FIG. 6 is a perspective view, partly exploded, of a loading station of a pipeline in the embodiment showing in FIG. 5.
Figure 7:
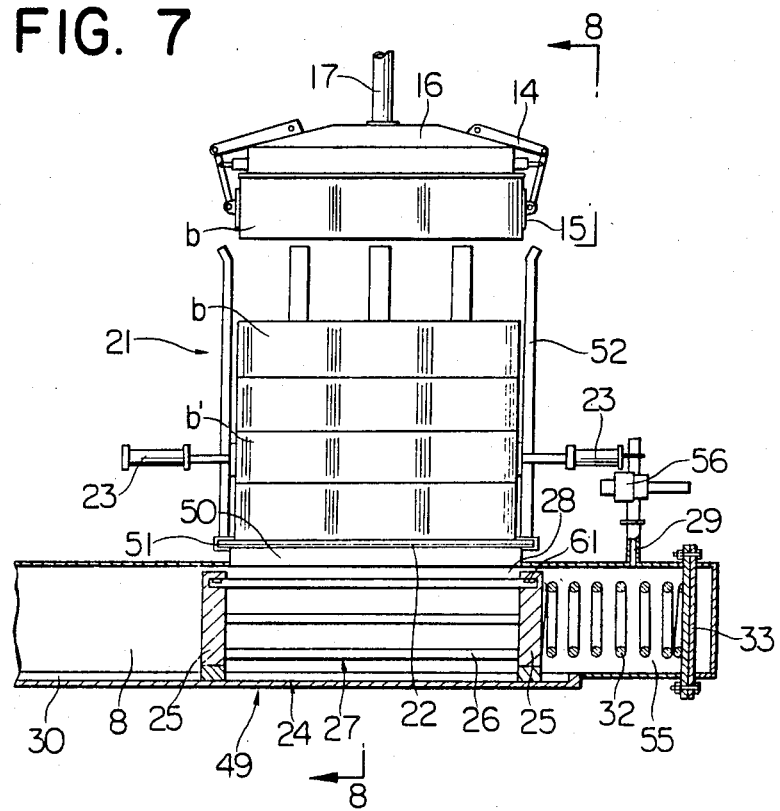
FIG. 7 is a longitudinally sectioned front view showing a portion of FIG. 6.
Figure 8:
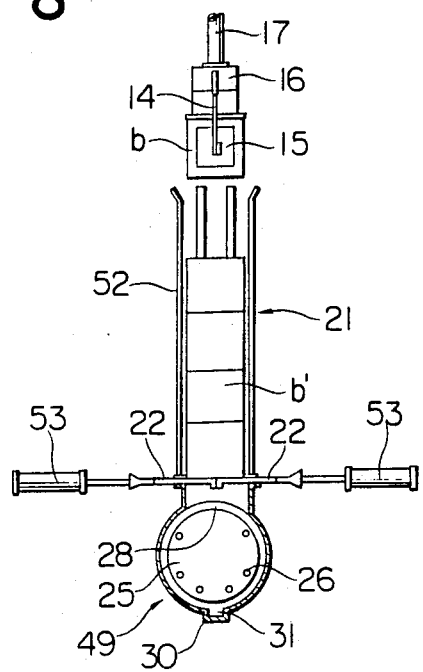
FIG. 8 is a fragmentary view sectioned on line 8—8 and as viewed in the direction of arrow.

Specifically making reference to FIGS. 6 to 8, it will be seen that a magazine rack 21 is installed above a loading opening 50 of the pipeline 8. The magazine rack 21 has a bottom plate 51 which is formed with an opening having substantially the same configuration as the carton block b. Mounted on the bottom plate 51 are several upright guide bars 52 which surround the carton block b. A pair of cylinders 23 oppose the opposite walls of the carton block b at intermediate portions of the guide bars 52. The bottom plate 51 has a lateral hole into which shutter plates 22 are slidably inserted laterally of the bottom plate 51. These shutter plates 22 are actuated by cylinders 53 to open or close the opening of the bottom plate 51.

Figure 10:
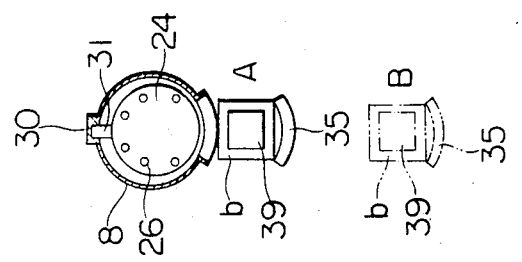
FIG. 10 is a view sectioned on line 10—10 and as viewed in the direction of arrow in FIG. 9.
Figure 9:
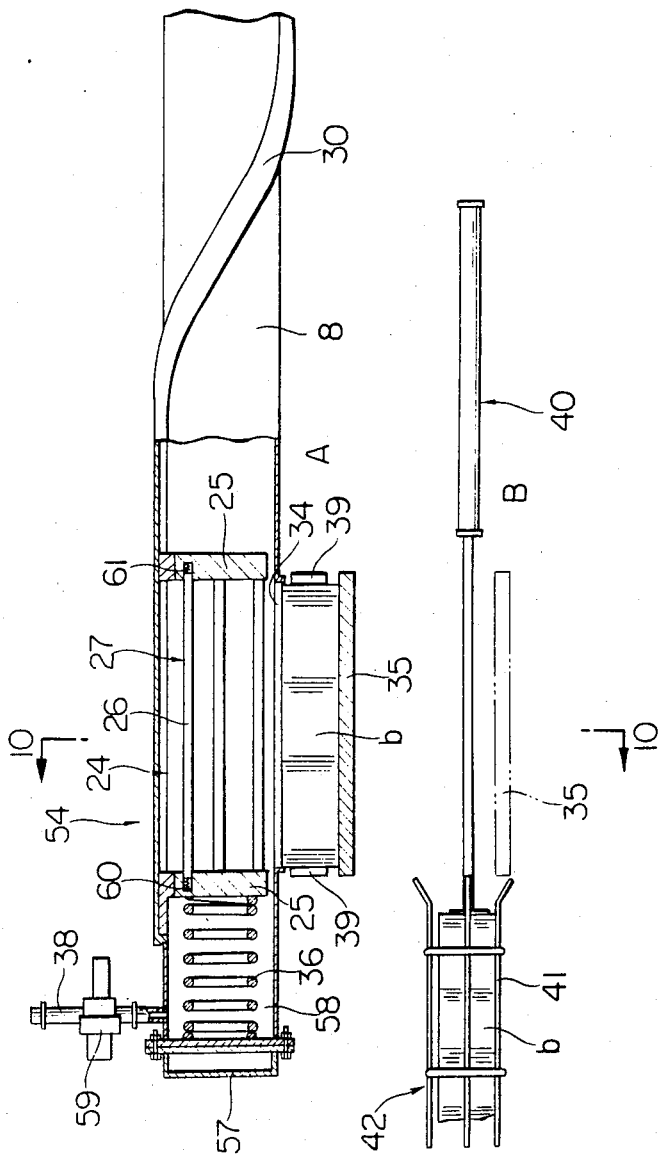
FIG. 9 is a front view, partly exploded, of an unloading station of the pipeline in the embodiment showing in FIG. 5.

The pipeline 8 has substantially a circular crosssectional configuration as will be seen from FIG. 8, and it is formed, in part, with a longitudinal groove 30 which occupies a bottom portion at the loading station 49 but is twisted upwards in the course of its extension so as to occupy a top portion at an unloading station 54 as shown in FIG. 10. At the loading station 49, the pipeline 8 has an extension serving as an air chamber 55 formed between a rear end wall of the loading opening 50 and a cover plate 33. The air chamber 55 connected with an air pipe 29 provided with a solenoid valve 56 accommodates a buffer spring 32 (FIG. 7). At the unloading station 54, the pipeline 8 has an unloading opening 34 faced downwards as clearly illustrated in FIG. 9 and an extension serving as an air chamber 58 formed between a fore end wall of the opening 34 and a cover plate 57. The air chamber 58 connected with an air pipe 38 provided with a solenoid valve 59 accommodates a buffer spring 36. A movable cover plate 35 is caused by a drive means (not shown) to move toward or away from the opening 34 so as to close the same except when unloading operation is carried out (FIG. 9). A pair of supporting plates 39 are provided which move relative to the opening 34 in synchronism with the movement of the cover plate 35. These supporting plates 39 are also caused by a drive means (not shown) to move toward or away from the cover plate 35 in the longitudinal direction. At a level where a back stroke of the movable cover plate 35 terminates, a guide means 42 is disposed which is constituted by several guide bars 41, of which the lowermost one is substantially flush with that level. The guide means 42 defines a space which is substantially conformable to the contour or geometry of the carton block b. A fourth pusher 40 opposes the guide means 42 with intervention of the movable cover plate 35.

A capsule 24 adapted to move along the interior of the pipeline 8 has a crosssectional configuration analogous to that of the pipeline 8. The capsule 24 has a diameter which is smaller than that of the pipeline 8 by several millimeters. The capsule 24 comprises opposed end plates 25 respectively provided with projections 31 which engage the groove 30, and a body portion 27 constituted by a plurality of flexible connecting bars 26 which interconnect the opposed end plates. Formed in the capsule 24 is an opening 28 for loading and unloading which diametrically opposes the projections 31. Opposite ends of each of the connecting bar 26 are received in blind holes 60 formed in the opposed end plates 25 so that the connecting bar can move a predetermined distance in the axial direction. Compression springs 61 are seated in gaps in the blind holes to bias the opposed end plates 25 such that these end plates normally space apart from each other. In FIG. 5, reference numeral 62 designates a utilization place to which the carton is guided by means of the guide means 42.

Preferably, the springs 32 and 36 are slightly magnetized.

As shown in FIG. 2, in the overall arrangement, there are provided a plurality sets of those members described hereinbefore and a carton block can be transported to a desired utilization place. For simplicity of illustration, only one utilization place 62 is depicted.

In operation, when a plurality of containers a loaded with a number of carton blocks b are aligned on the stock conveyor 1 as shown in FIG. 2, the dividing apparatus 3 transfers one of the containers a in the foremost row to the first conveyor 2. The thus transferred container a is moved by the conveyor 2 in the desired direction. In the illustration herein, it is assumed that relevant members at the lefthand end site are in operation. Accordingly, the following description will be given by referring to these members.

Figure 3:
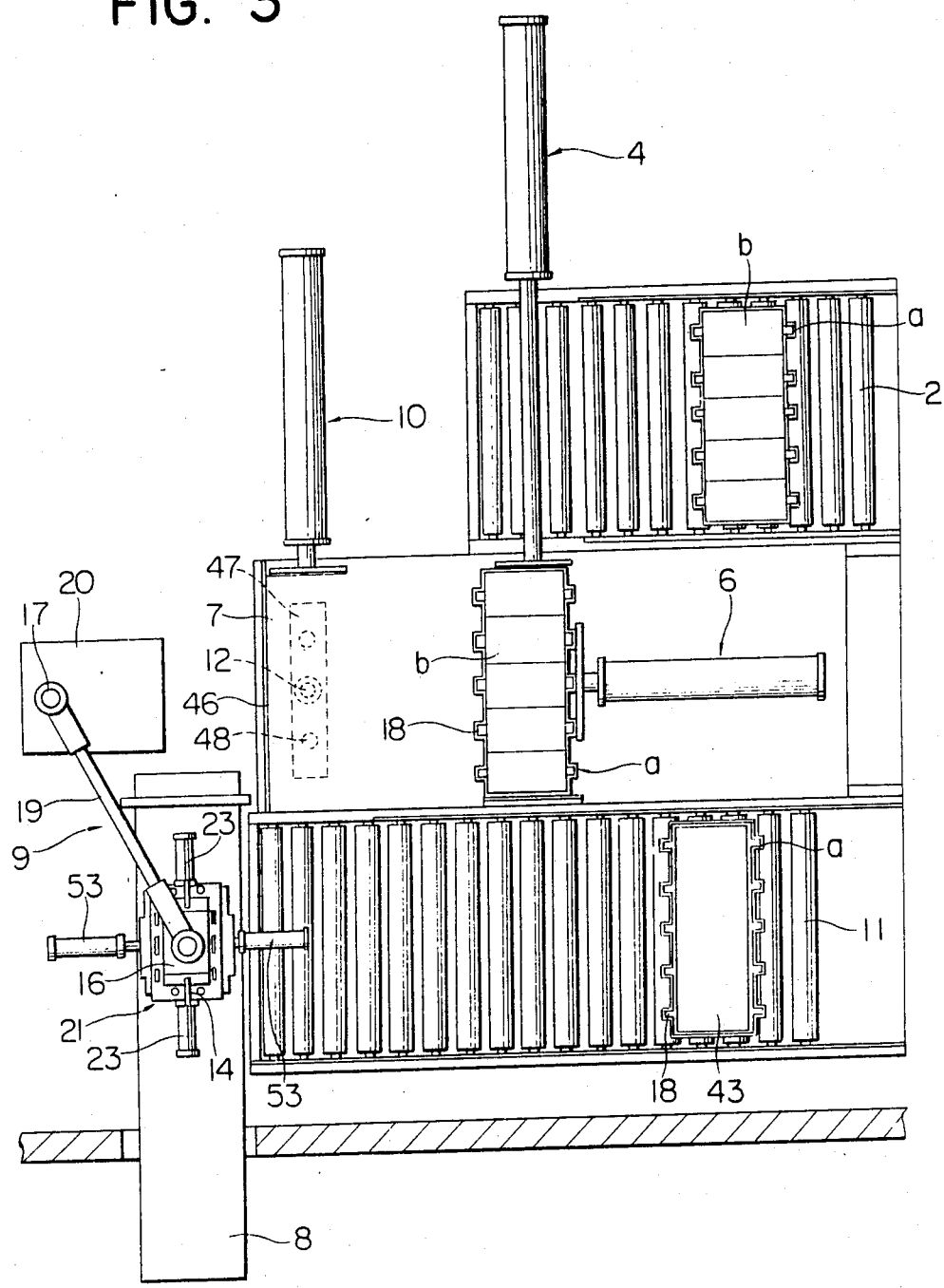
FIG. 3 is an enlarged plan view of a portion defined by an arrow line 3 in FIG. 2.

The container a is moved by the conveyor 2 until a lefthand end position of the conveyor 2 and is stopped thereat (FIG. 3). Subsequently, the container a is pushed by the first pusher 4 to the delivery portion 7 and then the first pusher 4 retracts to its original position.

Thereafter, the second pusher 6 is operated to move the container a to the left until the container a is stopped following engagement with the stopper plate 46. The cylinder 12 shown in FIG. 4 is then operated to raise the carton blocks b by a height equal to that of one carton block. At this time, the turn arm 19 of the robot 20 included in the transfer apparatus 9 is turned so that the suction head 16, which is mounted to the turn arm 19 at right angles thereto, may be positioned and stopped on a carton block b to be taken up. The suction head 16 is lowered until its bottom plate engages the upper surface of the carton block b. The suction pipe 17 is evacuated. The drive means 15A swing inward the holding pieces 15 and holding arms 14 so that the latter are closed and the holding pieces 15 are slidden within a pair of the opposed grooves 18 of the container a in order to hold or clamp the block b at its opposite ends. Simultaneously, the evacuation suction pipe 17 causes the bottom of the head 16 to adsorb (namely to grip by suction) the upper surface of the block b. The turn arm 19 is then moved upwards to take the block b out of the container a and turned until it reaches a location where the block b is above the magazine rack 21, as shown in FIG. 3. At this time, the holding arms 14 are opened to release the holding pieces 15 from the block b and concurrently therewith, the air suction by the head 16 is deactivated. Consequently, the block b drops into the magazine rack 21. The above operations are repeated to sequentially stack the carton blocks b within the magazine rack 21, as shown in FIGS. 7 and 8.

When the stacking of the carton blocks b within the magazine rack 21 has been brought to completion, the cylinders 23 are operated as best shown in FIG. 7 to clamp a block b' which is the second stack as counted from the bottom, and the cylinders 53 are operated as best illustrated in FIG. 8 to open the shutter plate 22. As a result, a block b of the lowermost stack drops into the capsule 24 which is now staying in the pipeline 8 of the loading station 49 beneath the block b. After the block b is received by the capsule 24, the shutter plate 22 is closed.

Then, the solenoid valve 56 is opened to permit supply of pressurized air from the air pipe 29 to the air chamber 55. Consequently, under the application of the pressurized air, the capsule 24 is moved through the pipeline 8 until it reaches the unloading station 54. In the course of the movement, the capsule 24 having the projection 31 in engagement with the groove 30 is turned through 180° so as to have its unloading opening 34 faced downwards at the unloading station. At the unloading station 54, the thus transported capsule 24 collides against the spring 36 with a mitigated collision impact and a suppressed repulsive force due to the magnetic force of the spring 36.

With the above construction, if the length of the carton block b is changed, then the length of the capsule 24 must be changed correspondingly. To this end, only the connecting bars 26 can be exchanged by simply removing the cover plate 33 or 57.

FIG. 9 illustrates the manner of taking the block b out of the pipeline 8 at the unloading station 54. More particularly, the movable cover plate 35 carrying the block b is first translated downwards. When the block b is spaced apart from the pipeline 8 at a position or level A, the supporting plates 39 are advanced to hold or clamp the block b at its opposite ends. Under the clamped condition, the block b is moved until a position B. At this position B, the supporting plates 39 are retracted to positions (not shown), and the fourth pusher 40 is in turn operated to push the block b into a space defined by the guide bars 41 of the guide means 42. In this manner, the transport of the block b from the container a to the guide means 42 ends.

Thereafter, the cover plate 35 is returned to the pipeline 8, the unloading opening 34 is closed, and the solenoid valve 59 is opened to supply pressurized air from the pipe 38 to the chamber 58, thereby returning the capsule 24 to the loading station 49.

If the pipeline 8 is curved, the capsule 24 can be deformed to follow curvature of the pipeline 8 during the movement or transport of the capsule 24 through the pipeline 8 since the body portion 27 of the capsule 24 is constituted by the flexible connecting bars 26, thereby ensuring smooth movement of the capsule 24. In addition, the springs 61 seated in the blind holes 60 for connection of the end plates 25 with the connecting bars 26 can not only facilitate the loading and unloading operations by extending the distance between the end plates but also assist in holding or clamping the block b by reducing the distance between the end plates under the application of the pressurized air during the transport of the capsule 24.

Following the repetitions operations set forth above, the container a on the delivery portion 7, now being removed of all the carton blocks, is acted upon by the third pusher 10. The vacant container a is consequently pushed to the second roller conveyor 11 and transported thereby to a recovery place (not shown).

Figure 11:
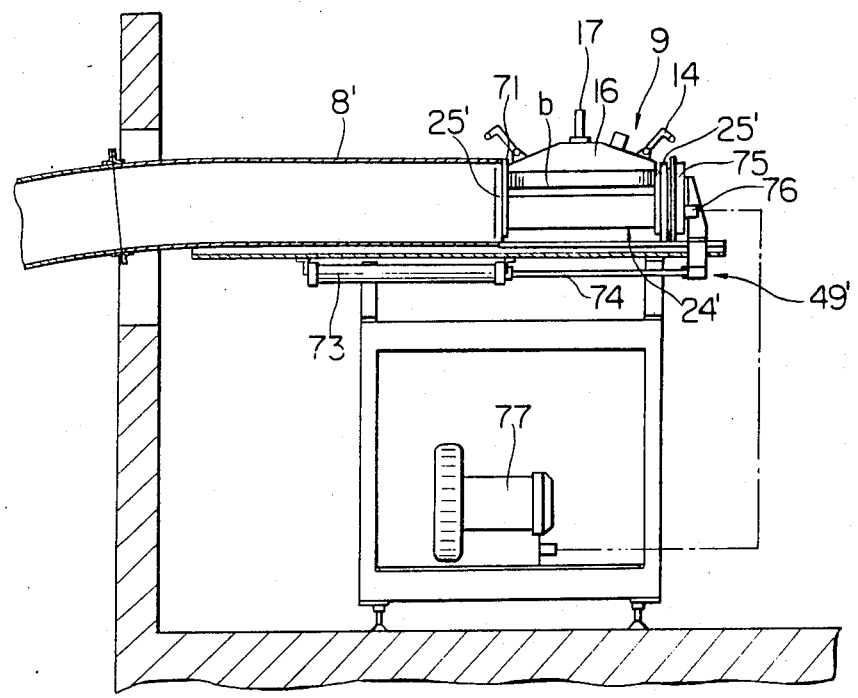
FIG. 11 is a longitudinally sectioned front view showing a loading station of the pipeline according to a second embodiment of the transport apparatus of the invention.
Figure 12:
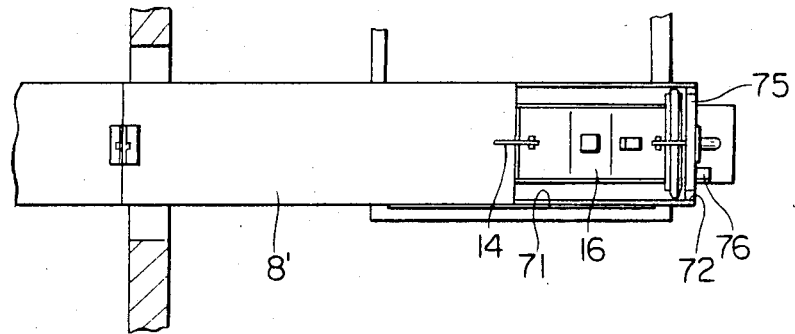
FIG. 12 is a plan view of the embodiment showing in FIG. 11.
Figure 13:
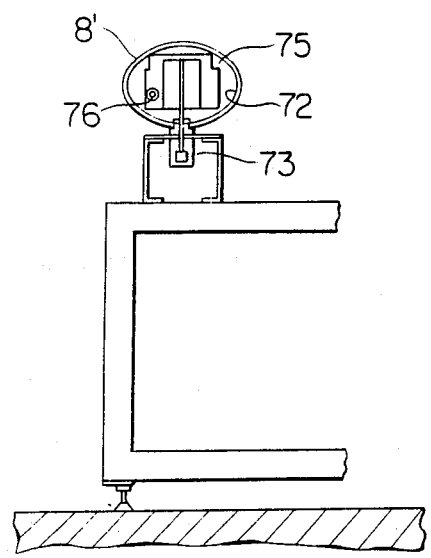
FIG. 13 is a right side view of FIG. 12.

Referring now to FIGS. 11 to 13, a second embodiment of the transport apparatus will be described. In the second embodiment, identical members to those of the first embodiment are designated by identical reference numerals, and only different members will be described. According to this embodiment, a pipeline 8' has an elliptical crosssectional configuration and is removed of the groove 30 provided for the first embodiment. Opposed end plates 25' of a capsule 24 are therefore substantially analogous to the elliptical configuration. In addition, the rear end of the pipeline 8' is not added with the air chamber and it has a rear end opening 72 which is contiguous to an upper loading opening 71. Mounted to the bottom surface of the pipeline 8' is a cylinder 73 which is directed toward the rear end of the pipeline. The cylinder 73 has a piston rod 74 with mounted, at the tip, with a push plate 75 which is inserted in the opening 72. The push plate 75 is connected with an air pipe 76 which in turn is connected to a blower 77.

In operation, when the carton transfer apparatus 9 directly loads a block b into the capsule 24' and then returns to its original position, the cylinder 73 is operated to cause the push plate 75 to push the capsule 24' into the pipeline 8'. At this time, the blower 77 supplies via the pipe 76 pressurized air for moving the capsule 24 through the pipeline 8'. Since the contour of the end plates 25' of the capsule 24' is substantially analogous to the crosssectional configuration of the pipeline 8', the capsule 24' can adapts itself for the pipeline 8' so as to move therethrough.

Figure 14:
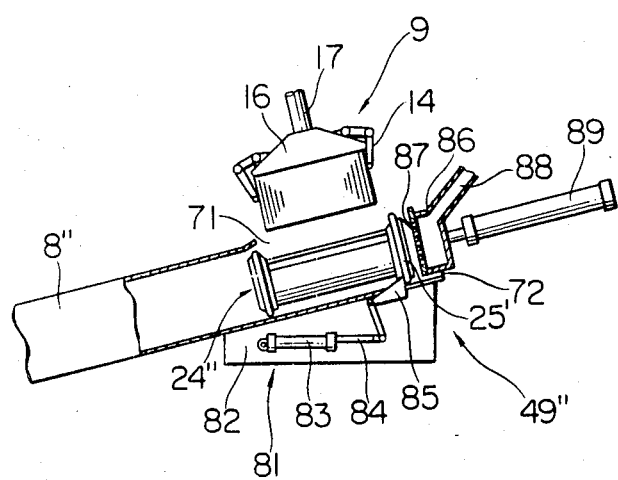
FIG. 14 is a longitudinally sectioned front view showing a loading station of the pipeline according to a third embodiment of the transport apparatus of the invention.

Turning to FIG. 14, there is illustrated a third embodiment of this invention which is a partial modification of the previous second embodiment. In the third embodiment, a transport pipeline 8" is inclined downwards. For this reason, it is necessary to prevent the capsule 24' from descending by weight when loading, and to this end, there is provided a stopper means 81. The stopper means 81 comprises a cylinder 83 mounted to a frame, and a bell crank 85 having one end pivoted at a piston rod 84 and an intermediate portion pivotally connected to the frame 82. The other end of the bell crank 85 can project into the pipeline 8" through a hole formed in the bottom of the pipeline 8". A push member 86 fitted in a rear opening 72 takes the form of a box which has a front wall formed with a number of air inlet ports. The push member 86 can be moved by a cylinder 89 and it is connected with an air pipe 88.

This embodiment operates in the same manner as the previous second embodiment except that upon loading the carton block, the cylinder 83 is operated to project the other end of the bell crank 85 into the pipeline 8" as best shown in FIG. 14 so that the other end engages a rear end plate 25' of the capsule 24' to thereby prevent movement of the capsule 24' and upon movement of the capsule, the other end is pulled out of the pipeline 8'''.

Details of the capsule 24' used in the second and third embodiments are depicted in FIGS. 15 and 16. Being different from the body portion 27 in the first embodiment, a body portion 27' of the capsule 24' comprises a rigid-plate body. Mounted to opposite ends of this body portion 27' are inner end plates 91, each of which has an outer surface formed with a dovetail groove 92 extending vertically and laterally. The end plate 25' has a joint member 93 which is slidably mounted in the dovetail groove 92. A universal joint 94 substituting for the joint member 93 is seen in FIG. 17. With the capsule 24' of the above structure, the body portion 27' per se will not deform when it moves past a curved or bent portion of the pipeline 8' as shown in FIG. 15, but the joint member 93 or 94 will permit the end plate 25' to be biased in accordance with the deformation of the pipeline 8', thereby making it possible to adapt the capsule 24' for the pipeline 8'.

Figure 19:
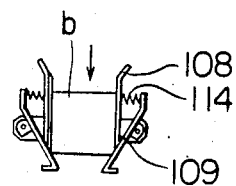
FIG. 19 is a plan view showing a keeping means in the embodiment showing in FIG. 18.
Figure 20:
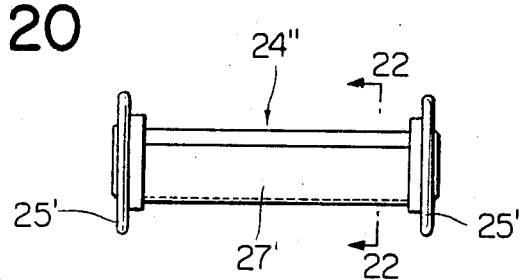
FIG. 20 is a front view showing a modified capsule used in the transport apparatus according to the invention.
Figure 21:
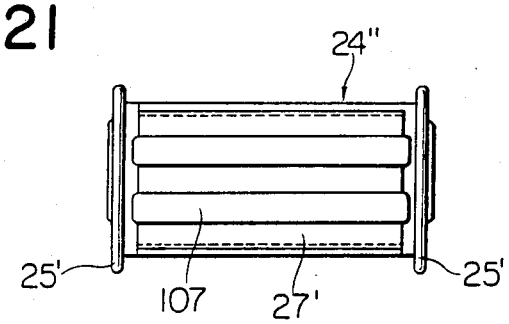
FIG. 21 is a plan view of the capsule shown in FIG. 20.
Figure 22:
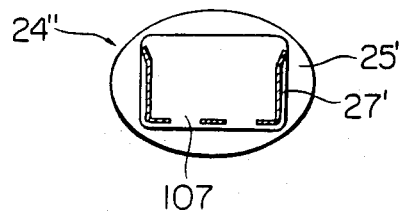
FIG. 22 is a sectional view taken on line 22—22 and as viewed in the direction of arrow.

Referring to FIGS. 18 to 22, there is seen a fourth embodiment of the transport apparatus according to the present invention. The fourth embodiment is different from the previous embodiments in that a transport pipeline 8''' having a similar configuration to that of the second and third embodiments is installed substantially vertically with respect to an associated unloading station 54', that a capsule 24'' has a structure as illustrated in FIGS. 20 to 22, that a guide means 42' is installed substantially vertically, and that a keeping means 100 for carton block b is interposed between the station 54' and the guide means 42'.

A shutter plate 102 opposing a bottom opening 101 of the pipeline 8''' at the unloading station 54' is adapted to operate, by the action of a cylinder 103, so as to open or close the opening 101. Connected to the shutter plate 102 is an air pipe 104 which in turn is connected to a pressurized air source not shown. Beneath the opening 101, a pusher 105, which is clear off this opening, is disposed laterally. The pusher 105 has, at the tip of its operating rod, a plurality of push plates 106 (two in this embodiment) which are spaced apart from each other at a predetermined interval.

The capsule 24'' to be moved through such a pipeline 8''' is constructed as shown in FIGS. 20 to 22, having a body portion 27'' in the form of a rigid-plate body with its bottom formed with a plurality of longitudinal slits 107 (two in this embodiment) which are spaced apart from each other at substantially the same interval as the push plate 106.

At the station 54', the block keeping means 100 is provided to oppose the pusher 105. This keeping means 100 has, as shown in FIG. 19, two stationary opposed guide plates 108 which are spaced from each other by a spacing that is substantially equal to the width of the block b. Swing plates 109 are pivotally mounted to the respective guide plates 108, and a compression spring 114 is interposed between a rear end of the swing plate 109 and the guide plate 108. Consequently, the swing plates 109 are normally biased such that the fore ends of the swing plates 109 get close to each other. These fore ends are adjacent to the guide means 42'.

The guide means 42' has several guide bars 41', disposed substantially uprightly, and a space intervening between these guide bars is formed which substantially resembles the contour of the block b. A first photosensor 110 is disposed laterally at portions of the guide means 42' which are immediately below the bottom of the keeping means 100. Movably supported below the photosensor 110 are two sets of first and second holding arms 111 and 112 which are spaced apart from each other a predetermined distance. These holding arms can be reciprocated by a drive means (not shown) between an upward position which is substantially flush with the bottom of the holding means and a downward position. A second photosensor 113 is laterally disposed below the arm 112, spaced apart therefrom a predetermined distance.

In operation, the capsule 24'' is transported to the unloading station 54' during closure of the opening 101 of the pipeline 8''' by means of the shutter plate 102. When the shutter plate 102 is opened, the capsule 24'' carried on the shutter plate 102 is lowered to a position as shown in FIG. 18. The pusher 105 is then operated to push the block b within the capsule 24'' toward the keeping means 100. The thus pushed block b is advanced under the guidance of the guide plates 108 as shown in FIG. 19 so as to be inserted into the guide means 42'. During the movement of the block b, the fore end surface of the block b opens the fore ends of the swing plates 109. The lowermost carton is held by either the arm 111 or 112 at the upward position. At this time, the pusher 105 remains pulled back but the block b will not be collapsed backwards because its rear end surface abuts against the fore ends of the swing plates 109.

When the block b has been inserted in the guide means 42', the first sensor 110 detects the block b and energizes the cylinder 103 so that the vacant capsule 24'' is pushed into the pipeline 8'''. Subsequently, the vacant capsule 24'' is moved toward the loading station under the application of pressurized air supplied from the air pipe 104.

Thereafter, the holding arm 112 moves to the downward position where the carton is dropped into a utilization place not shown. The dropping of the carton is detected by the second sensor 113 which in turn energizes the holding arms 111 and 112 so that these arms again move toward the upward position so as to hold a next carton within the guide means 42'.

In the transport apparatus described previously, the articles to be transported are unpacked flat articles. In dealing with flat articles of the type such as vessels or their covers or lids, however, these flat articles are typically stacked in the form of a carton block and packed in a bag with its opening folded, and the package is transported by the transport apparatus from a stockroom to a utilization plate or the guide means.

An apparatus 115 for pull-out of packaged material as shown in FIGS. 23 to 26 is adapted for a package containing such flat articles as vessels each having a flange 116 which projects outwardly of an upper edge of a dish-like body, whereby the vessels b' in a bag C are delivered out by removing the bag.

Figure 23:
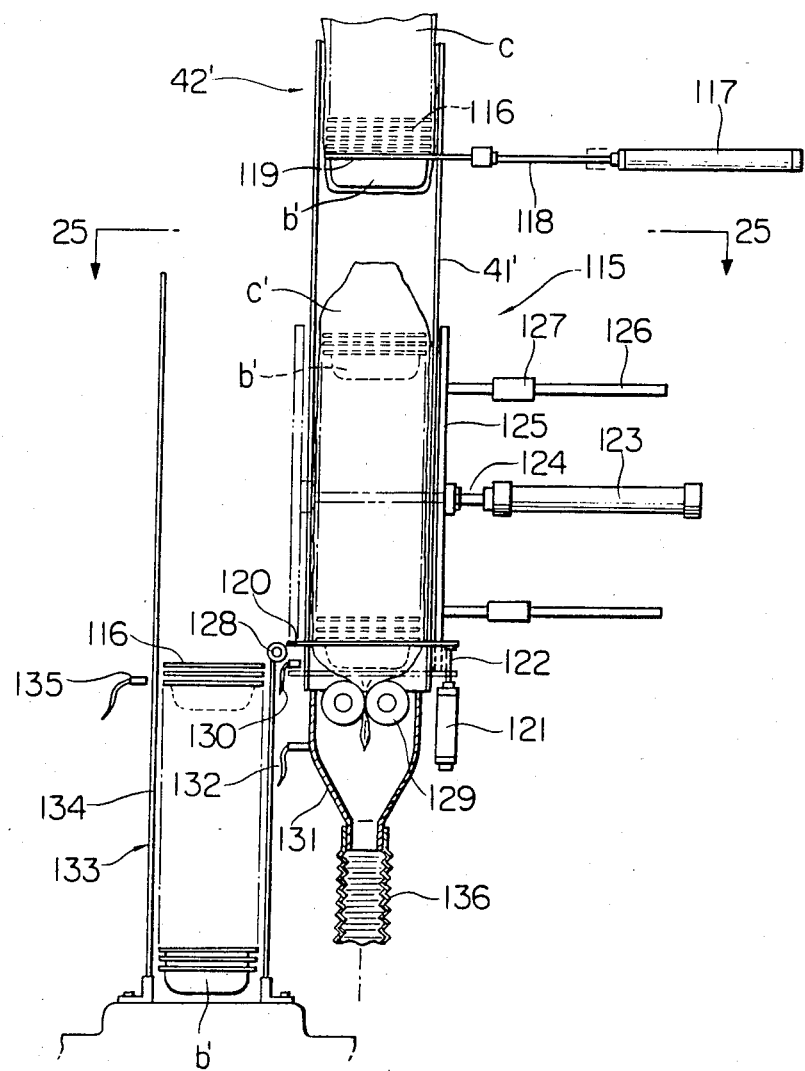
FIG. 23 is a longitudinally sectioned front view partially showing an apparatus for pulling out the packed material used when packed flat bodies are applied to the transport apparatus according to the invention.

Referring to FIG. 23, the lower portion of the guide means 42' is illustrated, above which a cylinder 117 is disposed laterally. A piston rod 118 of the cylinder 117 is mounted, at its tip, with two first supporting bars 119 which are spaced apart from each other by a distance sufficient to support a lower surface of the flange 116 of the vessel b'.

At the lowermost portion of the guide means 42' are disposed two second supporting bars 120 which are spaced apart from each other by the same distance as that for the first supporting bars 119, the second supporting bars being in parallel with the first supporting bars. The supporting bars 120 are mounted in common to an upper end of a piston rod 122 of a cylinder 121 which is disposed uprightly.

Between these supporting bars 119 and 120 is disposed a lateral cylinder 123, a piston rod 124 of which has, at its tip, a vertical push plate 125. Mounted to the push plate 125 is a guide bar 126 which is slidable in a guide means 127 supported by a frame not shown.

At a position where the supporting bars 120 are raised to an extreme, a roller 128 is disposed adjacently to tip ends of the supporting bars 120. Below a position where the supporting bars 120 are lowered to an extreme, there are provided a pair of first pull-out rollers 129 which come in contact with each other. Disposed near and above the rollers 129 is a first sensor 130. The rollers 129 are surrounded by a hopper 131, and a second sensor 132 adapted to detect the interior of the hopper is disposed exteriorly of the hopper 131. The hopper 131 is connected, at its bottom, to an air pipe 136.

Adjacent to and below the guide means 42′, a sub-guide means 133 is disposed substantially in parallel relationship to the guide means 42′. Like the guide means 42′, the sub-guide means 133 is constituted by a plurality of guide bars 134. Immediately beneath the roller 128 is a third sensor 135.

Figure 24:
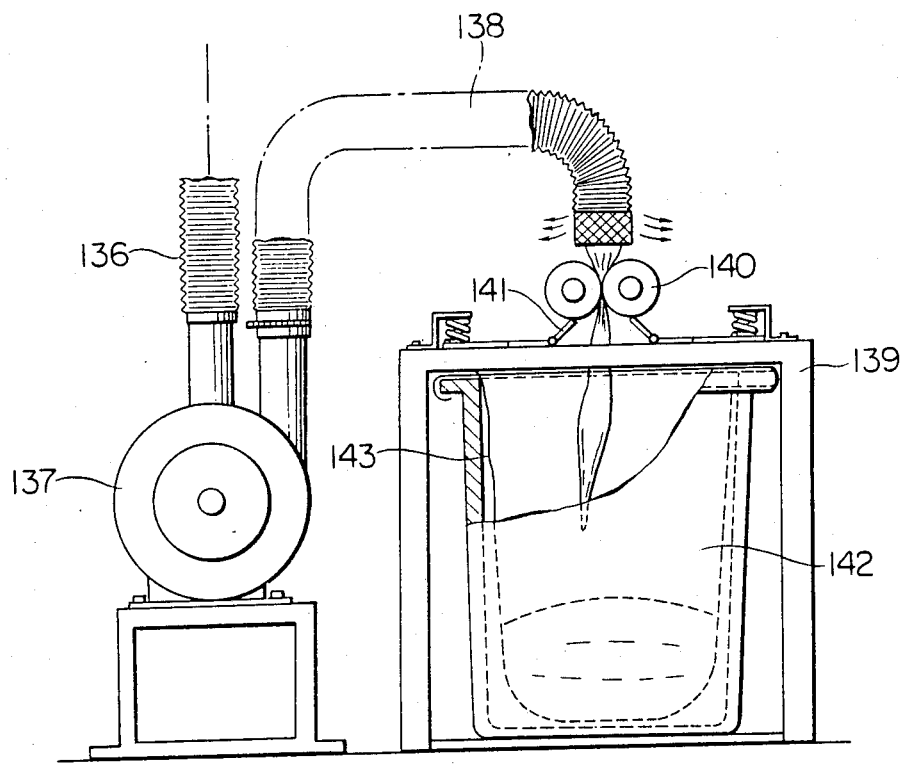
FIG. 24 is a longitudinally sectioned front view showing a storage for bags pulled out by the pull-out apparatus shown in FIG. 23.
Figure 25:
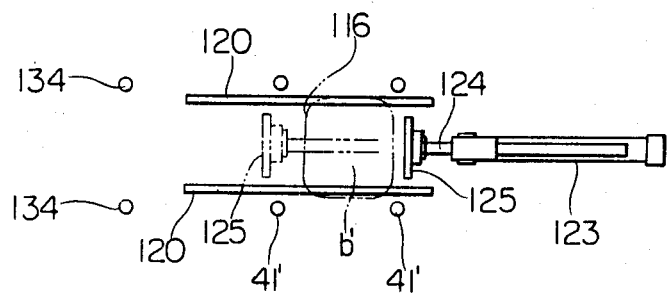
FIG. 25 is a view showing a portion of FIG. 23, sectioned on line 25—25 and as viewed in the direction of arrow.

As shown in FIG. 24, the pipe 136 is connected to an in-take port of a plate fan 137 with its discharge port connected to a pipe 138. Beneath an opening of the pipe 138, a pair of second pull-out rollers 140 in mutual contact are mounted on a frame 139. Scrapers 141, disposed beneath the rollers 140, are in engagement therewith. Removably mounted in the frame 139 is a container 142 to which a garbage bag 143 is detachably mounted.

Figure 26:
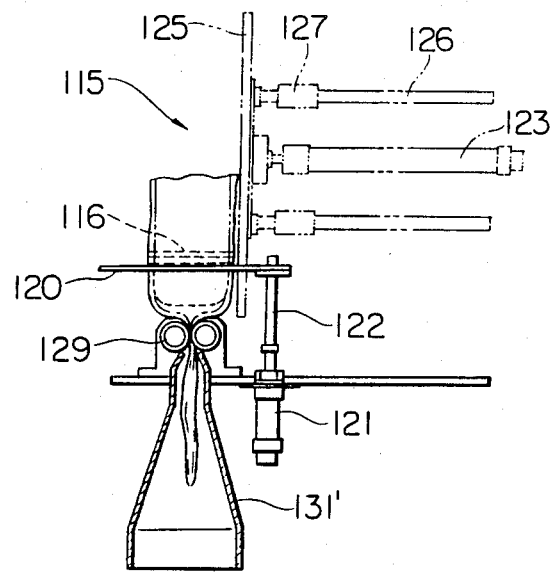
FIG. 26 is a longitudinally sectioned front view partially a modification of a portion of FIG. 23.

FIG. 26 shows a modified hopper 131′. This hopper is different from the hopper 131 of FIG. 23 only in configuration but has the same function.

In operation, as the bag C containing vessels descends through the guide means 42′, the flange 116 of a vessel b′ engages the first supporting bars 119 projecting into the guide means 42′ and rests thereon as shown in FIG. 23. In this case, a preceding bag C′ containing vessels is positioned below the bag C, as shown at solid line, and a flange of a vessel b′ is supported by the second supporting bars 120.

When the first sensor 130 detects the vessel b′, the cylinder 121 is operated to lower the supporting bars 120 along with the bag C′ to a position depicted by phantom line. The supporting bars 120 are stopped at this position and a lower end of the bag C′ is clamped and pulled down by the rollers which are normally rotating. As a result, this bag is caused to drop into the hopper 131. The bag C′ is then sent via the pipe 136, fan 137 and pipe 138 to the rollers 140 by which the bag C′ is discharged into the garbage bag 143. The scrapers 141 efficiently scrape off the bag C′ which would follows about the rollers 140.

In the event that the bag C′ does not pass through the hopper 131 within a predetermined time interval, the absence of the bag C′ will be detected by the second sensor 132 to energize an alarm buzzer (not shown), raising an alarm, and to prevent the cylinder 123 from operating as will be described later.

After the bag C′ has been pulled out in this manner, the cylinder 121 is operated in the opposite direction to cause the second supporting bars 120 now carrying unpacked vessels to be raised again to their initial positional state depicted by solid line. The supporting bars 120 stop at this initial position.

Then, if the third sensor 135 detects that the vessels b′, the top of which is flush with the sensor 135, are absent within the sub-guide means 133, the cylinder 123 is operated in response to this detection and the push plate 125 pushes the vessels b′ to the left in the drawing.

The lowermost vessel is then curried by the rolling roller 128 to move smoothly. Thus, the succeeding vessels b′ are sequentially stacked on the preceding vessels within the sub-guide means 133. The guide bar 134 associated with the sensor 135 is higher than the opposing guide bar and serves as a stopper against the vessels b′ pushed by the push plate 125.

Although a particular preferred embodiment of the invention has been disclosed in detail for illustrative purposes, it will be recognized that variations or modifications of the disclosed apparatus, including the rearrangement of parts, lie within the scope of the present invention.

Speaking of the capsule, for example, the combination of the end plates and body portion may be changed to provide either a combination of the end plates 25 with the rigid-plate body 27′ or a combination of the end plates 25′ with the flexible body 27. In addition, the other members may be employed in various combinations.

What is claimed is:

1. In a transport apparatus comprising a transport pipeline, and a capsule slidably mounted in said pipeline for movement therethrough under the application of pressurized air, the improvement which comprises a loading means, provided at a loading station, having a pair of approachable clamping arms, an unloading means, provided at an unloading station, having a pair of approachable clamping arms, a guide means for uprightly receiving unloaded articles to be transported, said articles being stacked in a flexible bag, a pair of rollers rotatably mounted on horizontal axes beneath a lower end opening of said guide means and having outer peripheral surfaces being in contact with each other for removing the bag from the stack of articles, and a support means interposed vertically between the bottom of the stack and said rollers for supporting the stack as the rollers pull the bag therepast off the stack.

2. In a transport apparatus comprising a transport pipeline, and a capsule slidably mounted in said pipeline for movement therethrough under the application of pressurized air, the improvement which comprises a loading means, provided at a loading station, having a pair of approachable clamping arms, an unloading means, provided at an unloading station, having a pair of approachable clamping arms, a guide means for uprightly receiving unloaded articles to be transported, said articles being stacked in a flexible bag, a pair of rollers rotatably mounted on horizontal axes beneath a lower end opening of said guide means and having outer peripheral surfaces being in contact with each other for removing the bag from the stack of articles, upper horizontal support means insertable into said guide means for supporting unloaded articles at an upper location in said guide means, lower support means disposed adjacent the bottom of said guide means and above said pair of rollers for supporting said unloaded articles at a lower position in said guide means, laterally shiftable means interposed between said upper and lower support means and laterally shiftable to shift said unloaded articles laterally out through one side of said guide means, sub-guide means disposed beside and substantially parallel to said guide means for receiving through the top thereof said unloaded articles laterally shifted from said guide means.

3. In a transport apparatus comprising a transport pipeline, and a capsule slidably mounted in said pipeline for movement therethrough under the application of pressurized air, the improvement which comprises a loading means, provided at a loading station, having a pair of approachable clamping arms, an unloading means, provided at an unloading station, having a pair of approachable clamping arms, a guide means for uprightly receiving unloaded articles to be transported, said articles being stacked in a flexible bag, a pair of rollers rotatably mounted on horizontal axes beneath a lower end opening of said guide means and having outer peripheral surfaces being in contact with each other for removing the bag from the stack of articles, a hopper extending from the open bottom end of said guide means, said pair of rollers being disposed in said hopper at the bottom end of said guide means and rotatable for gripping and pulling the bag downward off the stack of articles, a support means associated with the bottom of said guide means above said pair of rollers for supporting said stack of articles while said bag is pulled therefrom by said pair of rollers, and means for drawing the bag from the rollers to a disposal location.

4. The apparatus of claim 3, including a further support means horizontally insertable into said guide means at a location spaced above said first mentioned support means, said articles being traylike with horizontal peripheral flanges, said support means each comprising a pair of supporting bars laterally spaced to underlie opposite peripheral flange portions of an article so as to support said article therebetween, the upper one of said support means being shiftable horizontally out of said guide means to allow a bagged stack of articles to drop onto the first mentioned support means therebelow, said first mentioned support means being vertically shiftable to raise the stack thereon, and horizontal pusher means disposed vertically between said upper and lower support means and actuable for pushing a stack of articles, from which the bag has been removed, laterally out of said guide means, a sub-guide means provided beside the guide means for receiving a stack of unbagged articles laterally shifted out of said guide means.

5. In a transport apparatus comprising a transport pipeline, and a capsule slidably mounted in said pipeline for movement therethrough under the application of pressurized air, the improvement which comprises a loading means, provided at a loading station, having a pair of approachable clamping arms, an unloading means, provided at an unloading station, having a pair of approachable clamping arms, a guide means for uprightly receiving unloaded articles to be transported, said articles being stacked in a flexible bag, a pair of rollers rotatably mounted on horizontal axes beneath a lower end opening of said guide means and having outer peripheral surfaces being in contact with each other for removing the bag from the stack of articles, upper horizontal support means insertable into said guide means for supporting unloaded articles at an upper location in said guide means, lower support means disposed adjacent the bottom of said guide means and above said pair of rollers for supporting said unloaded articles at a lower position in said guide means while said bag is pulled therefrom by said pair of rollers, laterally shiftable means interposed between said upper and lower support means and laterally shiftable to shift said unloaded articles laterally out through one side of said guide means, sub-guide means disposed beside and substantially parallel to said guide means for receiving through the top thereof said unloaded articles laterally shifted from said guide means, a hopper extending from the open bottom end of said guide means, said pair of rollers being disposed in said hopper at the bottom end of said guide means and rotatable for gripping and pulling the bag downward off the stack of articles, and means for drawing the bag from the rollers to a disposal location.

* * * * *